United States Patent

Rainville

[11] 3,947,176
[45] Mar. 30, 1976

[54] DOUBLE INJECTION MOLD WITH NECK GATING

[75] Inventor: Dewey Rainville, Westfield, N.J.

[73] Assignee: Rainville Company, Inc., Middlesex, N.J.

[22] Filed: July 23, 1974

[21] Appl. No.: 491,063

[52] U.S. Cl. .......... 425/130; 425/DIG. 234; 264/97
[51] Int. Cl.² .......................................... B29D 1/04
[58] Field of Search .......... 425/DIG. 234, 130, 134, 425/387 B, 242 B, 112, 120, 127, 129 R; 264/97

[56] References Cited
UNITED STATES PATENTS

| | | | |
|---|---|---|---|
| 2,828,509 | 4/1958 | Smucker et al. | 425/243 |
| 3,482,284 | 12/1969 | Rees | 425/130 |
| 3,804,576 | 4/1974 | Hehl | 425/130 X |

FOREIGN PATENTS OR APPLICATIONS

| | | | |
|---|---|---|---|
| 1,072,799 | 1/1960 | Germany | 425/130 |
| 749,858 | 1/1967 | Canada | 264/97 |
| 45-40435 | 12/1970 | Japan | 264/97 |
| 1,950,212 | 4/1971 | Germany | 425/DIG. 234 |

Primary Examiner—J. Howard Flint, Jr.
Assistant Examiner—David S. Safran
Attorney, Agent, or Firm—Sandoe, Hopgood & Calimafde

[57] ABSTRACT

A parison for blow molding is applied to a core rod by successive injection operations in different injection molds. The material for the first layer is injected into the end of the mold cavity remote from the neck portion of the core rod, in the usual manner. The second layer is injected into the second injection mold cavity adjacent to the neck of the core rod to flow over the first layer in a direction from the cooler part of the first layer toward the hotter part. The twolayer parison is then transferred to a blowing mold where it is blown in the usual way.

6 Claims, 6 Drawing Figures

DOUBLE INJECTION MOLD WITH NECK GATING

BACKGROUND AND SUMMARY OF THE INVENTION

This invention applies a two-layer parison to a core rod in successive injection molds and then transfers the two-layer parison to a blowing mold. The practical difficulty, in the prior art, to the injecting of two layers of plastic on a core rod before blowing has been that the second layer damages the first layer.

The usual way of applying a parison to a core rod, in an injection mold, is to inject the plastic material into the mold cavity at the end of the cavity remote from the neck of the core rod. Thus the plastic material is applied to the end of the core rod which is furthest from any contact with the metal of the mold; and the injected material highly heats the end of the core rod since the only way in which heat can flow from the end of the core rod is lengthwise toward the neck and through the relatively restricted cross-section of metal.

When the core rod was transferred to a second injection mold, and the injection operation repeated, the hot plastic material would contact with the hottest part of the plastic of the first layer and would wash some or all of this material off the tip of the core rod leaving no first layer on the tip portion of the core rod, or at least very little material of the first layer. This produced an unsatisfactory parison; but if sufficient time were allowed to lapse for the first layer to cool to a temperature where it would not be washed off, then the time cycle of the molding machine was increased to such an extent as to be impractical.

This invention obtains a second layer of plastic on the parison without requiring extra cooling time for the first layer. The new result is obtained by applying the second layer by neck gating. The first layer of plastic cools as it spreads along the core rod toward the neck end of the cavity. This cooling results from the fact that the plastic material is in contact with the wall of the cavity and is also in contact with portions of the core rod which are progressively closer to the neck which is held by the mold. The metal of the cavity wall and of the core rod neck, and the metal of the mold which grips the core rod neck all provide heat sinks into which heat flows from the plastic that forms the first layer of the parison. Thus the temperature of the first layer of the parison is progressively lower toward the neck of the core rod.

This invention injects the plastic for the second layer of the parison at the neck end of the second injection mold cavity. Thus the hot plastic for the second layer comes into contact first with the coolest part of the first layer and this material of the first layer is cool enough to withstand the flow of the second layer material without being washed off the core rod or even deformed by the flow of the new material. The material for the second layer is cooled by contact with the lower temperature plastic at the first layer and as the second layer material flows toward the other end of the core rod, the flowing material is cooled by contact with the wall of the cavity of the second injection mold. Thus it reaches the tip end of the core rod at a lower temperature than its injection temperature and at a time when the first layer on the tip of the core rod has had more opportunity to cool.

By making a parison in accordance with this invention three advantages are obtained. The invention eliminates the mark from the bottom of the blown article because the runner mark left on the tip end of the first layer is covered by the second layer. The invention shortens the cycle because it is not necessary to wait for the tip of the first material to cool; and it makes it possible to mold on top of a much thinner primary layer.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
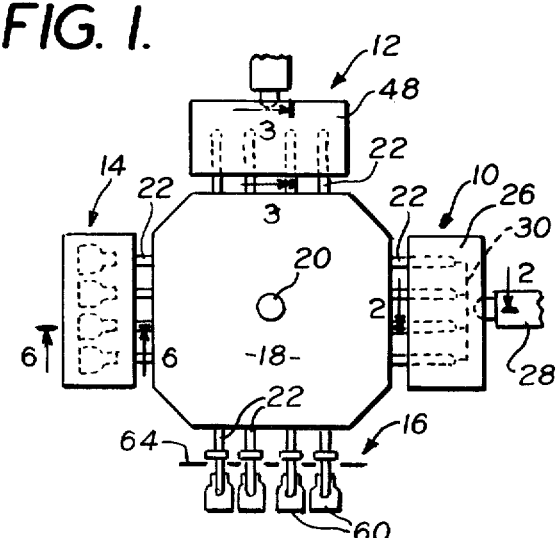
FIG. 1 is a diagrammatic top plan view of a fourstation blow molding machine having two injection molds in accordance with this invention.

FIG. 1 shows an injection molding maching having a first injection station 10; a second injection station 12; a blowing station 14; and a stripper station 16. The machine has an indexing head 18 which rotates intermittently about a center shaft 20. There are core rods 22 extending from the different faces of the indexing head 18. These core rods 22 extend into molds at the various operational stations and the indexing head stops with the core rods in alignment with the mold cavities.

Since the molding machine shown in FIG. 1 has four operational stations, the indexing head 18 has four corresponding side faces related to one another at 90° angular spacing, this being what is known as a "four-position machine".

At the first injection station 10 there is an injection mold 26 which is supplied with molten plastic from a plasticizer 28 which injects the molten material into the middle cavities through a runner indicated diagrammatically and identified by the reference character 30.

Figure 2:
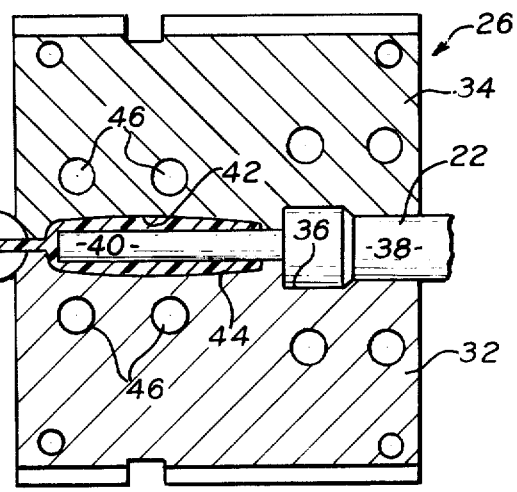
FIG. 2 is a greatly enlarged sectional view through the first injection mold of FIG. 1.

FIG. 2 is a sectional view through the mold 26 which includes a stationary lower section 32 and a movable upper section 34. When these mold sections are brought together so as to close the mold, each of the core rods 22 extends through an opening 36 which is formed in the mold. The neck portion 38 of each core rod is firmly gripped by the wall of the opening 36.

The core rod 22 extends from the neck portion to a tip portion 40 of the core which is supported as a cantilever from the neck portion 38.

The mold 26 has a cavity 42 which is of somewhat larger cross section than the part of the core rod 22 which extends into the cavity 42. The cavity is also somewhat longer than the core rod 22 so that when molten plastic is injected into the cavity 42 it coats the core rod 22 with a parison 44. This parison 44 covers the tip portion 40 of the core rod and flows back along the core rod to the neck end of the cavity 42.

As the molten material for the parison 44 is injected into the cavity 42, and flows along the length of the core rod (toward the right in FIG. 2), the molten plastic contacts with the core rod 22 and with the wall of the mold 42. The mold wall 42 is cooled by cooling chambers 46 formed in the upper and lower sections of the mold 26. Thus the parison 44 gives up some of its heat to the mold 26 and some of its heat to the core rod 22. Because of the larger cross section of the neck portion 38 of the core rod, there is considerably more metal at this neck end of the core rod which serves as a heat sink for the molten plastic material that flows into the neck end of the cavity 42. The highest temperature plastic is that at the tip end of the core rod and the core rod is at its highest temperature at the tip portion 40.

Upon completion of the injection operation illustrated in FIG. 2, the mold 26 opens as the upper section 34 rises; and the core rods 22 are lifted clear of the mold cavity in the lower section 22 by rising movement of the indexing head from which the core rods 22 extend. this is conventional practice. The indexing head turns 90° and brings the core rods with the parisons 44 on them over the lower section of a second injection mold 48 at the second injection station 12.

Figure 3:
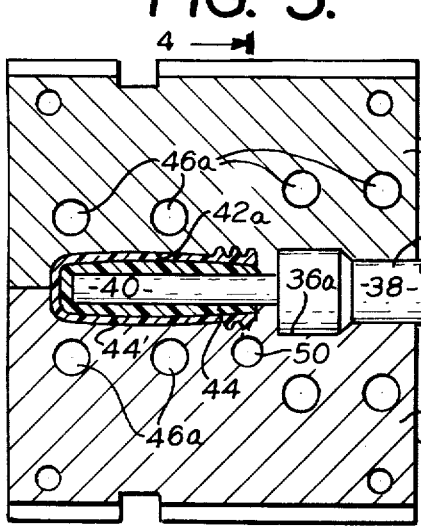
FIG. 3 is a view similar to FIG. 2 but taken through the second injection mold of FIG. 1.

As the second injection mold 48 closes on the neck portion 38 (FIG. 3), it is gripped by the wall of an opening 36a corresponding to the opening 36 of the mold 26 already described in connection with FIG. 2. Parts of the mold 48 which correspond with the mold 26 are indicated by the same reference characters with a letter "a" appended. The lower and upper mold sections 32a and 34a, respectively, are cooled by cooling fluid circulating in cooling chambers 46a. The mold 48 has mold cavities 42a which are somewhat larger in cross-section than the corresponding cavity 42 shown in FIG. 2. Thus the parison 44 does not fill the cavity 42a and there is space around the parison 44 for receiving a second layer of plastic indicated by the reference character 44'.

Figure 4:
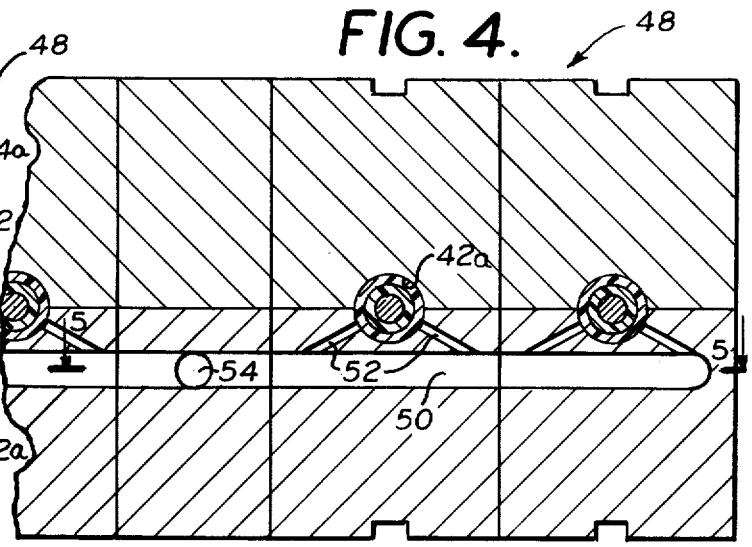
FIG. 4 is a fragmentary sectional view taken on the line 4—4 of FIG. 3.

If the molten plastic for the outer layer 44' were injected into the cavity 42a from the tip end of the cavity, the injection of the hot molten plastic from the plasticizer into contact with the hottest part of the parison 44 would wash some or all of the parison 44 off the tip portion 40 of the core rod and the first layer of plastic on the core rod would be missing from the tip end or greatly distorted so that it's wall thickness flows different at different parts of its area, as already explained in the introduction of the specification. To avoid this result, the plastic for the outer layer 44' is introduced into the cavity 42 from a manifold runner 50, best shown in FIG. 4. This manifold runner 50 has individual runners 52 communicating with the different cavities 42a of the mold 48. The individual runners 52 communicate with the cavity at the neck end of the cavity and the introduction of the material into the cavity at this end is commonly referred to as "neck gating".

The molten material that enters the cavity 42a through the runners 52 comes in contact with the coolest part of the parison 44. As this plastic for the second layer 44' enters the cavity 42a and flows toward the left in FIG. 3, toward the tip of the core rod, it contacts with the wall of the cavity 42a and it's temperature decreases progressively as it flows along the first layer parison 44 toward the tip end of the cavity 42a. While the material for the second layer 44' is at its highest temperature, therefore, it contacts with the part of the first layer parison 44 which is at its lowest temperature; and the second layer material cools to a lower temperature as it flows leftward in the cavity 42a and toward the hotter end of the first layer parison 44. This results in the coating of the first layer 44 by the second layer 44' without any damage or deformation to the first layer by the hot plastic material of the second layer.

Figure 5:
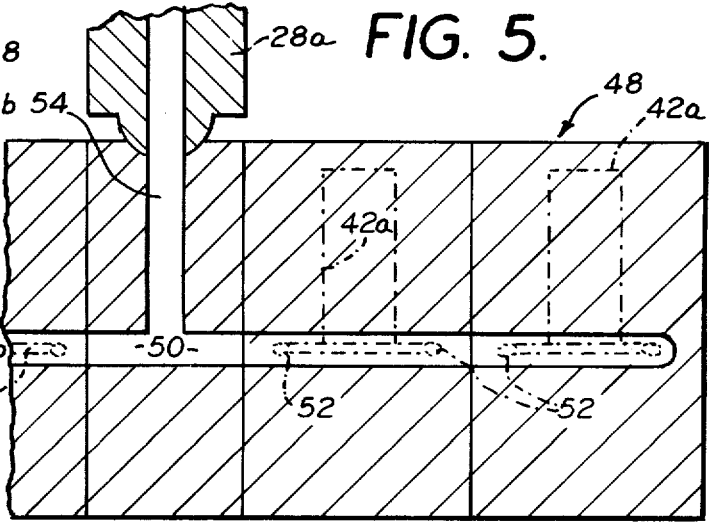
FIG. 5 is a sectional view taken on the line 5—5 of FIG. 4.

FIG. 5 shows a plasticizer 28a communicating directly with a main runner 54 which leads to the manifold runner 50 from which the individual runners 52 convey plastic to the respective cavities 42a of the mold 48.

Figure 6:
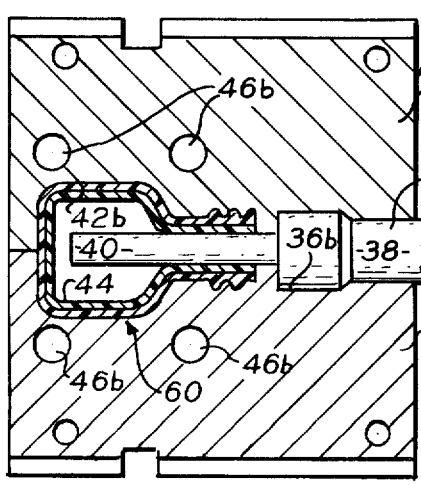
FIG. 6 is a sectional view through the blow mold of FIG. 1.

With the next intermittent movement of the indexing head, the core rods 22 are moved from the mold 48 to a mold 58 at the blowing station 14. Parts of the mold 58 are indicated by the same reference characters 26 but with a letter "b" appended. The mold 58 holds the neck portion of the laminated parison, designated in its entirety by the reference character 60. Beyond the neck portion, the cavity 42b is of larger cross-section and shaped to the outline of the article which is to be blown from the laminated parison. FIG. 6 shows the laminated parison 60 in its blown condition and thus the reference character also indicates the product made by the operation of the three operational stations 10, 12 and 14 of the machine shown in FIG. 1.

The blowing operation illustrated in FIG. 6 is conventional and because of the making of the complete parison in two layers, the container or product 60 is of laminated construction with the inner and outer laminations chosen for particular advantages which the intended service of the product makes advantageous. For example, the inner layer 44 may be made of material which resists reaction with the contents of the container; and the outer layer 44' may be made of a material of substantially greater strength than the inner layer.

The blown products 60 advance to the stripper station 16 (FIG. 1) with the next intermittent movement of the indexing head 18; and at the stripper station a stripper 64 pushes the molded products 60 from the core rods 22 in accordance with conventional practice.

The preferred embodiment of the invention has been illustrated and described, but changes and modifications can be made and some features can be used in different combinations without departing from the invention as defined in the claims.

What is claimed is:

1. Molding apparatus including a first and a second injection mold, a core rod movable from one mold to the other, each injection mold having a cavity with means at one end for gripping the neck end of the core rod when the core rod is in the mold, each injection mold having a passage through which plastic is injected into the cavity, one of the molds having its injection passage at an end of the cavity at which the core rod is gripped and the other mold having its injection passage at the other end of its cavity, means for injecting material about said core rod in said first mold cavity and sequentially moving the core rod from said first mold cavity to the next, and for injecting a superimposed layer of molding material about said core rod is said second mold cavity to form a two-layer parison on the core rod.

2. The molding apparatus described in claim 1 characterized by the molds being part of a blow molding machine including a plurality of core rods, a support to which the core rods are connected at their neck ends, means that move the core rod support intermittently to shift the core rods from one operational station to another, operational stations including the first injection mold, the inlet passage for the plastic into the cavity of said first injection mold being at the end of the cavity remote from the neck end of the core rod, the second injection mold having its inlet passage for the plastic into the cavity at the end of the cavity nearest to the neck end of the core rod, a blowing mold to which the core rod is transferred from the second injection mold, means for blowing a laminated product in the blowing mold, and a stripper station that removes blown products from the core rods beyond the blowing mold.

3. The molding apparatus described in claim 2 characterized by the injection molds being spaced from one another, and the means for moving the core rod from the first injection mold to the second injection mold including the core rod support and being movable between two positions that cause the core rod and the parison to pass through the ambient atmosphere and to cool therein while passing from the first to the second injection mold.

4. The molding apparatus described in claim 2 characterized by the neck end of the core rod connecting with the support at regions of substantially lower temperature than the temperature of the injection molds whereby the neck end core rod connections provide a heat sink for heat from the core rod and the parison thereon, the mass and heat conductivity of the heat sink structure being sufficient to cool the neck end of the parison to a substantially lower temperature than the other end of the parison before the core rod is coated with a second layer in the second injection mold.

5. The molding apparatus described in claim 2 characterized by means for cooling the cavity of the second injection mold so that plastic injected into the cavity of the second mold at the neck end of the core rod cools at it travels across the cavity wall toward the end of the core rod remote from the neck end whereby the plastic injected into the second mold contacts first with the lower temperature portion of the first layer of the parison and cools to a lower temperature as it travels toward the higher temperature end of the first layer of the parison.

6. The molding apparatus described in claim 1 characterized by the support for the core rods being an indexing head that rotates about a center axis and that has faces at equal angular positions about the center axis, one of the core rods projecting from each of the faces of the indexing head, the operational stations being located at angular positions corresponding to the angular spacing of the faces of the indexing head, the first injection mold including means for cooling the cavity therein, the second injection mold also including means for cooling the cavity therein, the angular space between the first and second injection molds including space across which the core rod and parison travel through the ambient atmosphere and in which the parison undergoes a degree of cooling, and the passage through which plastic is injected into the cavity of the second injection mold being neck gated by a passage opening into the mold cavity of the second injection mold adjacent the neck end of the core rod.

\* \* \* \* \*